H. R. HUGHES.
ADJUSTABLE BEARING FOR DRILL BIT CUTTING DISKS.
APPLICATION FILED SEPT. 23, 1914.
1,163,540.
Patented Dec. 7, 1915.
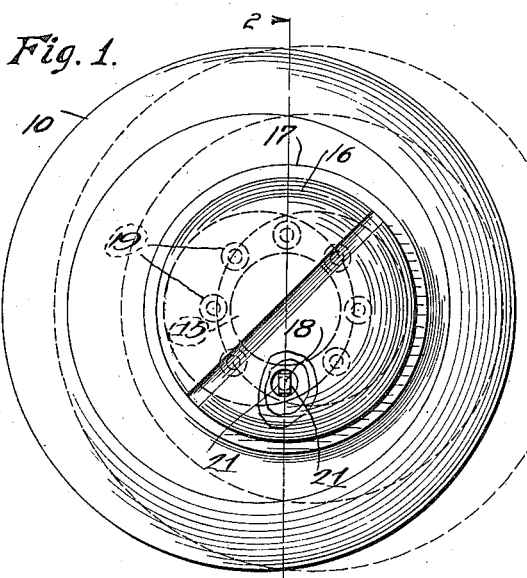
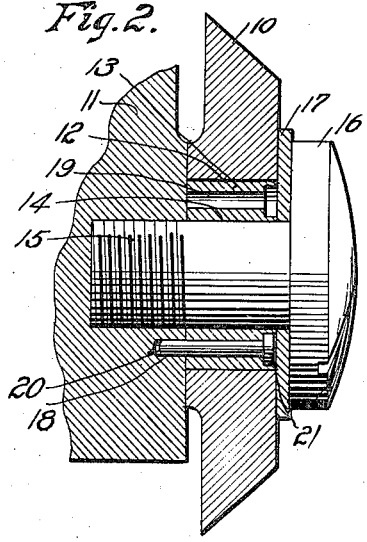
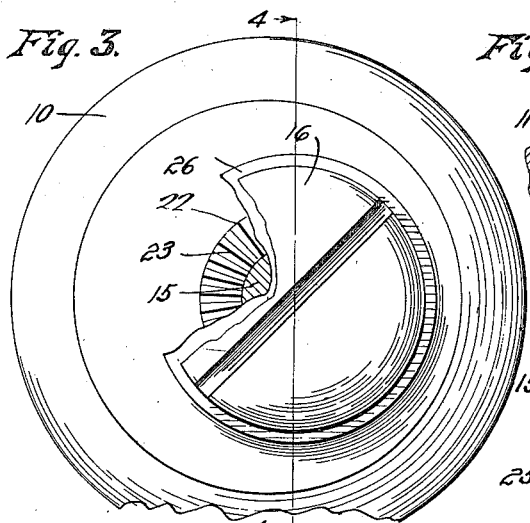
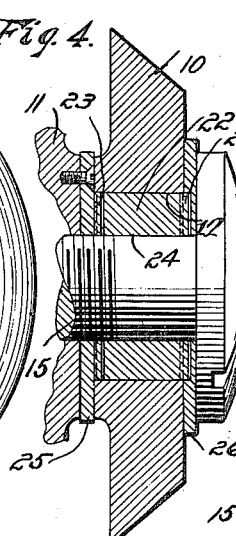
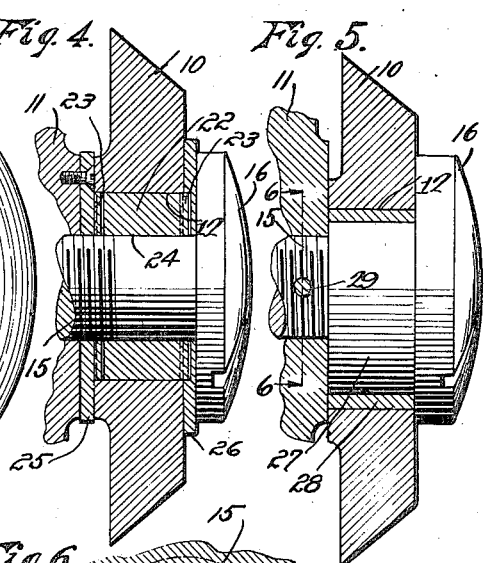
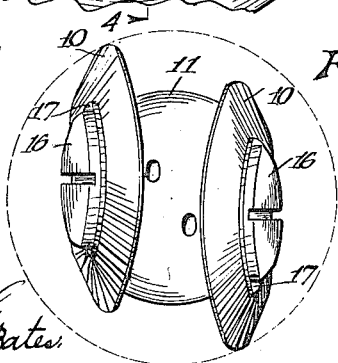
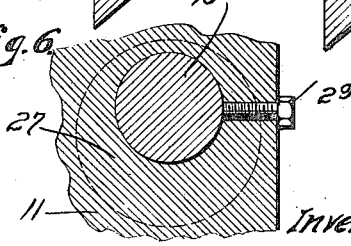
Witnesses
B. G. Pf.
Marguerite Bates
Inventor
Howard R. Hughes
By
Att'ys

UNITED STATES PATENT OFFICE.

HOWARD R. HUGHES, OF LOS ANGELES, CALIFORNIA, ASSIGNOR TO SHARP-HUGHES TOOL COMPANY, OF HOUSTON, TEXAS, A CORPORATION OF TEXAS.

ADJUSTABLE BEARING FOR DRILL-BIT CUTTING-DISKS.

1,163,540.     Specification of Letters Patent.     Patented Dec. 7, 1915.

Application filed September 23, 1914. Serial No. 863,201.

*To all whom it may concern:*

Be it known that I, HOWARD R. HUGHES, of the city of Los Angeles, county of Los Angeles, State of California, have invented new and useful Improvements in Adjustable Bearings for Drill-Bit Cutting-Disks, of which the following is a specification.

This invention relates to an adjustable bearing for drill bit cutting disks of the rotary type.

In rotary disk drills of the type having rotary cutting disks arranged on the opposite sides of the drill shank with their arbors off-set in relation to each other on a horizontal plane, the diameter of the bore cut by the blades is governed by the diameters of the disks and their offset in relation to the drill head. The wearing away of the disks or the grinding of same to sharpen the cutting edges thereof, results in lessening their diameters and consequently reduces the diameter of the bore cut thereby, thus necessitating the interchanging and renewing the cutting disks where it is desired to maintain the bore of equal diameter throughout its length.

It is the object of this invention to provide means whereby the cutting disks may be adjusted in relation to the drill head to compensate for the reduced diameter of the cutting disks so that the disks may be frequently resharpened and replaced, and yet, form a bore of the desired diameter irrespective of the decreased diameter of the cutting disks.

Another object is to provide a bearing for the cutting disks having an eccentric portion which can be turned to various positions in relation to the drill head and thereby vary the projection of the cutting edge of the rotary disk, and to provide means for securing the bearing against displacement.

The invention is illustrated in the accompanying drawing, in which:

Figure 1 is a view of the cutting disk and its mounting in front elevation, and illustrating the manner of adjusting the mounting to vary the position of the cutting disk on a horizontal plane. Fig. 2 is a detail vertical section on the line 2—2 of Fig. 1 partly in elevation. Fig. 3 is a view in front elevation with parts broken away of the modified form of the invention. Fig. 4 is a detail vertical section on the line 4—4 of Fig. 3. Fig. 5 is a detail vertical section showing a further modification of the invention. Fig. 6 is a detail section and elevation on the line 6—6 of Fig. 5. Fig. 7 is a view in end elevation of the drill bit showing the invention as applied, and illustrating the manner in which the drill cutting disk may be adjusted in relation to the vertical center of the drill heads to vary the diameter of the bore cut thereby.

More specifically, 10 indicates the rotary cutting disk, and 11 denotes the drill head on which the disk is revolubly and adjustably mounted. The cutting disk 10 is provided with a center circular bore 12 to receive a bushing on which the disk is revolubly mounted. In the preferred form of the invention shown in Figs. 1 and 2 the bushing is indicated at 13, and consists of a circular disk having an eccentric bore 14 therethrough adapted to receive an arbor consisting of a stud 15, here shown as screwed into the drill head 11, having a fillister head 16, a washer 17 being interposed between the outer face of the cutting disk 10 and screw head 16.

The bushing 13 is of a length corresponding to the bore 12 in the cutting disk 10, and is adapted to be turned to various positions on the stud 15 and secured against movement in relation thereto.

Any suitable means for locking the bushing 13 may be employed, but preferably the means here shown consists of a removable headed pin 18 adapted to be inserted through any one of a series of counter bores 19 formed in the bushing 13, and extended into a socket 20 formed in the drill head 11. Oppositely disposed flats are formed on the head of pin 8 as indicated at 21 to permit the pins being grasped by a suitable tool and removed when occasion requires.

A washer 17 is interposed between the outer surface of cutting disk 10, and the head 16 of stud 15 to hold the pin 18 in place.

Any number of the bores 19 may be formed in the bushing 13 and are arranged concentric with the bore 14 so that they may be moved into register with the socket 20.

By varying the position of the bushing 13 on the stud 15, the position of the cutting disk may be varied as occasion may require.

In the form of the invention illustrated in Figs. 3 and 4 the bushing is indicated at 22, and is provided with serrations 23 on its outer and inner faces. The serrations 23 on the inner face of the bushing 22 are adapted to engage similar serrations formed on a disk 25 rigidly mounted on the drill head 11, and the teeth 23 on the outer face of the bushing 22 are designed to be engaged by similar serrations formed on the inner face of a washer 26, which is adapted to lie adjacent to the outer end of the bushing 22 and partially extend over the outer face of the cutting disk 10, in which position it is retained by the head 16 of the stud 15.

In the form of the invention illustrated in Figs. 5 and 6 the stud 15 is formed with an eccentric portion 27 to receive a circular bushing 28 on which the cutting disk 10 revolves; adjustment of the position of the cutting disks being effected by rotating the stud 15 in its threaded connection with the drill head 11. The stud 15 carrying the eccentric portion 27 is locked against rotation by means of a set screw 29 or in any other suitable manner, whereby the eccentric portion 27 may be retained in any desired position.

In the operation of the invention the position of the cutting disk 10 in relation to the drill head 11 is varied by altering the position of the bushing 13 or 22 or the eccentric portion 27 on the stud 15, and thereafter locking these members against movement in relation to the drill head.

What I claim is:

1. A mounting for rotary cutting disks, comprising the combination of a drill head, a stud thereon, an eccentric bearing carried by said stud, a rotary cutting disk mounted on said bearing, and means for adjusting the eccentric bearing on said stud in various positions in relation to the drill head.

2. An adjustable mounting for rotary cutting disks, comprising the combination of a drill head, an eccentric bearing secured to said head for adjustment angularly about its eccentric axis, a cutting disk revolubly mounted on said bearing, and means for securing the bearing against angular displacement in various positions.

3. An adjustable bearing for rotary disk bits, comprising the combination of a drill head, a stud carried by said drill head, an eccentric bushing carried by said stud having openings therein, means engageable in any one of said openings and with the drill head, whereby the bushing may be secured against movement in various adjusted positions, and means for holding a cutting disk on said bushing.

4. A mounting for rotary cutting disks, comprising the combination of a drill shank, a stud thereon, an eccentric member carried by said stud adapted to receive a revoluble cutting disk, and means for detachably securing the eccentric member against movement in relation to the drill head.

In witness that I claim the foregoing I have hereunto subscribed my name this 14th day of Sept., 1914.

HOWARD R. HUGHES.

Witnesses:
MARGUERITE BATES,
MARIE BATTEY.